United States Patent
Linde

(10) Patent No.: US 10,654,021 B2
(45) Date of Patent: May 19, 2020

(54) AUTOCLAVE AND METHOD FOR WELDING THERMOPLASTIC COMPOSITE PARTS

(71) Applicant: Airbus Operations GmbH, Hamburg (DE)

(72) Inventor: Peter Linde, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 325 days.

(21) Appl. No.: 15/807,447

(22) Filed: Nov. 8, 2017

(65) Prior Publication Data

US 2018/0133681 A1  May 17, 2018

(30) Foreign Application Priority Data

Nov. 14, 2016  (EP) .................................. 16198612

(51) Int. Cl.
*B01J 19/12*   (2006.01)
*B29C 65/14*   (2006.01)
(Continued)

(52) U.S. Cl.
CPC .............. *B01J 19/126* (2013.01); *B01J 3/04* (2013.01); *B29C 65/1425* (2013.01);
(Continued)

(58) Field of Classification Search
CPC ..... B01J 19/126; B01J 3/04; B01J 3/03; B01J 2219/0879; B29C 65/1425;
(Continued)

(56) References Cited

U.S. PATENT DOCUMENTS 4,339,295 A * 7/1982 Boretos ............... B29C 65/1425
156/155
5,601,745 A    2/1997 Schalk et al.
(Continued)

FOREIGN PATENT DOCUMENTS

| CN | 102869773 B | 1/2013 |
| CN | 103587128 A | 2/2014 |
| JP | H091668 A   | 1/1997 |

OTHER PUBLICATIONS

Chinese Examination Report for corresponding Chinese Patent Application No. 201711120336.1 dated Jun. 18, 2019.
(Continued)

*Primary Examiner* — Benjamin R Shaw
(74) *Attorney, Agent, or Firm* — Greer, Burns & Crain, Ltd.

(57) ABSTRACT

An autoclave for welding thermoplastic composite parts comprises a sealed process chamber, a pressure source, a microwave source and a workpiece supporting member configured to support at least two thermoplastic composite parts which contact each other in an abutting section within the process chamber. The pressure source is configured to generate positive pressure in the process chamber which is higher than an ambient pressure surrounding the process chamber while the microwave source emits microwaves towards the abutting section in order to locally melt the thermoplastic composite parts and weld them together in the region of the abutting section.

15 Claims, 1 Drawing Sheet

(51) Int. Cl.
  *B29C 65/78* (2006.01)
  *H05B 6/80* (2006.01)
  *B29C 65/00* (2006.01)
  *B01J 3/04* (2006.01)
  *B29K 101/12* (2006.01)
  *B29L 31/00* (2006.01)

(52) U.S. Cl.
  CPC ...... *B29C 65/1467* (2013.01); *B29C 65/7802* (2013.01); *B29C 66/1122* (2013.01); *B29C 66/54* (2013.01); *B29C 66/721* (2013.01); *B29C 66/73116* (2013.01); *B29C 66/73921* (2013.01); *B29C 66/8266* (2013.01); *H05B 6/80* (2013.01); *B29C 66/91411* (2013.01); *B29C 66/91441* (2013.01); *B29C 66/92441* (2013.01); *B29C 66/9672* (2013.01); *B29C 66/9674* (2013.01); *B29K 2101/12* (2013.01); *B29L 2031/7156* (2013.01); *F17C 2209/221* (2013.01); *H05B 2206/044* (2013.01)

(58) Field of Classification Search
  CPC . B29C 65/1467; B29C 65/7802; B29C 66/54; B29C 66/721; B29C 66/73316; B29C 66/73921; B29C 66/8266; B29C 66/91411; B29C 66/91441; B29C 66/92441; B29C 66/9672; B29C 66/9674; H05B 6/80; H05B 2206/044; H05B 6/72; B29K 2101/12; B29L 2031/7156; F17C 2209/221

USPC ....... 219/690, 691, 695, 697, 700, 745, 746, 219/750, 757
See application file for complete search history.

(56) References Cited

U.S. PATENT DOCUMENTS

| | | | |
|---|---|---|---|
| 6,284,089 B1 | 9/2001 | Anderson et al. | |
| 2005/0022922 A1* | 2/2005 | Banasky | B29C 35/0227 156/94 |
| 2007/0108194 A1* | 5/2007 | Meyer | B01J 3/03 219/690 |
| 2014/0044914 A1* | 2/2014 | Kurtz | B32B 3/28 428/74 |
| 2016/0346416 A1* | 12/2016 | Schwartz | A61L 2/18 |
| 2018/0133681 A1* | 5/2018 | Linde | B29C 65/1425 |

OTHER PUBLICATIONS

European Search Report, dated Apr. 25, 2017, priority document.
"Recent Advantages in International Polymer Welding Research and Development"; Benatar A., Jan. 1, 2005.
"DLR Portal—World's first microwave autoclave for composite structure production"; Redaktions Dlr. De et. al, Apr. 18, 2007.

* cited by examiner

AUTOCLAVE AND METHOD FOR WELDING THERMOPLASTIC COMPOSITE PARTS

CROSS-REFERENCES TO RELATED APPLICATIONS

This application claims the benefit of the European patent application No. 16198612.0 filed on Nov. 14, 2016, the entire disclosures of which are incorporated herein by way of reference.

BACKGROUND OF THE INVENTION

The invention relates to an autoclave and a method for welding thermoplastic composite parts.

Document U.S. Pat. No. 6,284,089 B1 discloses a method for joining thermoplastic composite sandwich panels which have an induction heated susceptor in between for welding the panels to each other.

SUMMARY OF THE INVENTION

A problem to be solved by the present invention is to provide an autoclave and a method for welding thermoplastic composite parts which improve the quality of the weld for large thermoplastic composite parts.

This problem is solved by an autoclave and a method for welding thermoplastic composite parts.

An autoclave for welding thermoplastic composite parts comprises a process chamber which is sealed against the ambient atmosphere outside of the process chamber. The autoclave further comprises a pressure source configured to generate positive pressure in the process chamber which is higher than an ambient pressure surrounding the autoclave. Further, the autoclave comprises a microwave source and a workpiece supporting member configured to support at least two thermoplastic composite parts/workpieces to be welded which contact each other in an abutting section within the process camber. The pressure source is configured to generate positive pressure in the process chamber which is higher than an ambient pressure surrounding the autoclave while the microwave source emits microwaves towards the abutting section in order to locally melt the thermoplastic composite parts and weld them together in the abutting section.

The addition of contactless pressure helps pressing thermoplastic composite parts during welding together and improves their weld quality, in particular for larger thermoplastic composite parts. The conventional application of mechanical force for pressing both thermoplastic composite parts together at their contact-/abutting section combined with the increased temperature at the thermoplastic composite parts could lead to deformations. Such deformation can be avoided by providing a pressure inside the autoclave according to the invention which automatically distributes the pressure force along the entire available surface of the thermoplastic composite parts to press them together uniformly and gently. The entire weld is created at the same time, without a moving tool, which reduces stress on the parts. Also, such welding is energy efficient, since only the abutting section is heated, rather than the entire parts or the entire volume in the autoclave.

The autoclave may comprise a first monitoring device adapted to monitor a position and/or an orientation of the thermoplastic composite parts in the process chamber. Thus, in particular the position and/or the orientation of the abutting section within the process chamber may be determined. Alternatively or additionally, a second monitoring device may be provided which is adapted to monitor the shape of the thermoplastic composite parts in the process chamber. The first and the second monitoring device may be designed in the form of separate devices. It is, however, also conceivable to equip the autoclave with only a single monitoring system which embodies or comprises the first and the second monitoring device.

Further, the autoclave may comprise a temperature sensor adapted to monitor a temperature of the abutting section. The temperature sensor may be a non-contact infrared temperature sensor, which preferably is configured such that its orientation and/or its position are/is adjustable relative to the workpiece supporting member and hence the thermoplastic composite parts supported thereon. Preferably, the temperature sensor is positioned within the process chamber such that it is directed towards the abutting section, preferably towards visible edges of the abutting section and hence capable of measuring the temperature in the region of the abutting section. The measurement of temperature directly at the abutting section is beneficial, because this is the most relevant section for the welding quality.

In particular, in case the microwaves emitted by the microwave source are directed towards the abutting section, the air in the process chamber is lower than the temperature in the region of the abutting section such that deriving the temperature of the abutting section from the temperature of the air inside the process chamber would be highly imprecise. However, when the temperature at the visible edge of the abutting section is measured, the temperature distribution along the abutting section can be determined, depending on the material of the parts, their thickness, the pressure inside the process chamber, the shape and dimensions of the abutting section, for example.

The autoclave may also comprise a pressure sensor adapted to monitor the pressure within the process chamber. Like the temperature, the pressure within the process chamber is an important parameter for determining whether or not welding is performed correctly and the result will be satisfying. For example, if the pressure is too low, the parts will not be pressed together with sufficient force resulting in a weak weld, and if the pressure is too high, the parts can be deformed during welding due to the increased temperatures. Also, if the temperature, in particular in the abutting section, is too low, the weld will be weak because no or not enough material of the two parts will melt, and if the temperature is too high, there is a risk of deformation of the parts as too much of the material of the two parts will melt. Moreover, pressure and temperature are interrelated and advantageously measured and monitored in order to adjust their ratio.

At least one of the first or the second monitoring device may comprise at least one camera that is configured to film the workpiece supporting member and preferably also the thermoplastic composite parts. In particular two or more cameras are provided and configured to film the workpiece supporting member, and preferably also the thermoplastic composite parts, from different perspectives. Thereby the position and orientation of the parts to be welded can be determined and monitored in a reliable manner which can help adjusting the microwave source(s) accordingly as will be described in further detail below. Using two or more cameras allows for several views, e.g., from above and from beneath the parts to be welded, or one three-dimensional view of the parts/the process chamber of the autoclave.

Preferably the workpiece supporting member is transparent in order to allow a camera to capture the parts to be welded through it. The camera(s) may be configured to only detect a marker, such as a barcode or QR-code, on one or all of the parts to be welded, e.g., in order to control and set the microwave source in dependence of the type, i.e., e.g., the material, the size and the shape of the parts, which allows the use of less cameras or only one camera of lower specifications such that costs are reduced. The camera(s) may also be configured to record the filmed material. The autoclave may further comprise a display configured to display the filmed/recorded images to supervise the welding process in the process chamber by an operator. However, the entire welding process may also proceed autonomously, e.g., controlled by a CPU, such that control via a display becomes unnecessary or less important.

The autoclave may further comprise a control unit adapted to control an operation of at least one of the workpiece supporting member, the pressure source or the microwave source in dependence on at least one of the position and/or orientation of the thermoplastic composite parts in the process chamber, the temperature of the abutting section, the shape of the thermoplastic composite parts in the process chamber, and the pressure within the process chamber. The autoclave may be provided with a central control system which controls the operation of the workpiece supporting member, the pressure source and the microwave source. It is, however, also conceivable that the autoclave is equipped with separate control units for controlling the operation of the workpiece supporting member, the pressure source and the microwave source.

At least one of the microwave source or the workpiece supporting member may movable. In particular, the microwave source may be configured to be moved along an inner wall of the process chamber and/or to be tilted in order to direct the microwaves emitted from the microwave source towards the abutting section.

Hence, the relative position of the microwave source and the workpiece supporting member may be changed as desired. Preferably, the microwave source and the workpiece supporting member are movable relative to each other in dependence on the position and/or orientation of the thermoplastic composite parts in the process chamber in order to direct the microwaves emitted from the microwave source onto the abutting section. Basically, a positional change of the microwave source and/or the workpiece supporting member may be effected manually. Preferably, however, the microwave source and/or the workpiece supporting member are movable under the control of the control unit.

The microwave source may be configured such that an orientation and/or an intensity of the microwaves emitted from the microwave source is adjustable based on at least one of a distance between the microwave source and the abutting section, the orientation of the microwaves emitted from the microwave source relative to the abutting section or the temperature of the abutting section. Thereby, the operation of the microwave source can be adapted to differently sized parts placed on the workpiece supporting member and/or different abutting sections of the parts. Further, a uniform temperature in the abutting section can be maintained. For example, if the temperature in the abutting section is determined to be too high, the intensity of the microwaves emitted by the microwave source may be decreased and/or the microwave source may be directed away from the abutting section or to parts of the abutting section whose temperature is too low.

The microwave source may be configured such that an orientation and/or an intensity of the microwaves emitted from the microwave source is adjustable so as to reduce the temperature in the abutting section upon detection of a change of the shape of the thermoplastic composite parts in comparison to their initial shape upon placement in the process chamber. In other words, the operation of the microwave source may be controllable, e.g., by the control unit, on the basis of a length of a main/central microwave beam axis of the microwave source to a point of impact on the abutting section (distance) and on the basis of an angle between the main/central microwave beam axis of the microwave source and the abutting section at the point of impact of the main/central microwave beam axis on the abutting section. Thereby, a uniform heat distribution in the abutting section can be achieved and maintained.

Alternatively or additionally, the pressure source may be configured to reduce the pressure within the process chamber upon detection of a change of the shape of the thermoplastic composite parts in comparison to their initial shape upon placement in the process chamber. In particular, the microwave source may be configured to reduce the temperature in the abutting section and/or the pressure source may be configured to reduce the pressure within the process chamber upon detection of an abnormal change of the shape of the abutting section and/or of non-abutting sections of the thermoplastic composite parts.

If a deformation in the shape of one of the parts is determined, one possible cause is an excess air pressure within the process chamber. The temperature in the abutting section may be another cause, because high temperatures may result in a softening and even melting of the material of the parts such that an undesired deformation may occur. Therefore, preferably the temperature of the parts, preferably of the abutting section, is monitored and the orientation and/or intensity of the microwaves emitted from the microwave source are/is adjusted in dependence on the temperature of the abutting section such that an actual deformation of the parts can be avoided. An adjustment of the orientation and/or the intensity of the microwaves emitted from the microwave source upon detection of a change of the shape of the thermoplastic composite parts in comparison to their initial shape upon placement in the process chamber, however, can be provided as an additional quality control measure.

The autoclave may comprise multiple microwave sources that may be arranged along an inner wall of the process chamber. This allows for a uniform heating of the abutting section of the parts. The microwave sources may be arranged in one or multiple rows. The arrangement in rows allows longitudinal abutting sections to be welded together under uniform temperatures. The multiple microwave sources may be configured to be controlled individually. Preferably their intensity may be controlled individually, e.g., depending on a position and/or an orientation of the abutting section. Thereby, the heat can be uniformly distributed inside the abutting section. For example, some microwave sources can be turned off while others can be adjusted in regard to their position, orientation and resulting distance to select a suitable intensity of the emitted microwaves such that the abutting section is uniformly heated. Also, microwave sources could switch positions with others when overheated in order to prevent them from damage, or failed microwave sources can be automatically replaced or compensated by others, which avoids the need for maintenance every time one of the many microwave sources fails or malfunctions.

The microwave source(s) may emit microwaves of a, preferably distinct, frequency between 915 MHz to 2.45 GHz. The advantage lies in the fact that cheap consumer microwave sources (2.45 GHz) can be used or higher power standard industrial sources (915 MHz). In both cases, replacing the microwave source(s) in case of failure or malfunction will be easy and fast because a standard is used, which is easily available. The microwave source(s) may further emit microwaves of different distinct frequencies in the above range. Thereby, a wider variety of applications is possible, because the autoclave would offer a welding with different microwave frequencies depending on the composite material of the parts, their thickness, the size of the parts and their abutting section and the distance of the abutting section to the microwave source(s). Also, a combination of such microwave sources with distinct microwave frequencies that differ from each other may be used to improve the weld quality.

In a method for welding thermoplastic composites in an autoclave two thermoplastic composite parts, which contact each other in an abutting section, are placed on a workpiece supporting member inside a sealed process chamber of the autoclave. The sealed process chamber is pressurized with positive pressure which is higher than an ambient pressure surrounding the process chamber by means of a pressure source.

Simultaneously, i.e., while the process chamber is held under the elevated pressure, microwaves are emitted from a microwave source towards the abutting section in order to locally melt the thermoplastic composite parts and weld them together in the region of the abutting section.

The method further comprises at least one of the additional steps of monitoring a position and/or an orientation of the thermoplastic composite parts in the process chamber, monitoring a temperature of the abutting section, monitoring the shape of the thermoplastic composite parts in the process chamber or monitoring a pressure within the process chamber.

An operation of at least one of the workpiece supporting member, the pressure source or the microwave source may be controlled in dependence on at least one of the position and/or orientation of the thermoplastic composite parts in the process chamber, the temperature of the abutting section, the shape of the thermoplastic composite parts in the process chamber, or the pressure within the process chamber.

At least one of the microwave source or the workpiece supporting member may be moved in dependence on the position and/or orientation of the thermoplastic composite parts in the process chamber in order to direct the microwaves emitted from the microwave source onto the abutting section.

An orientation and/or an intensity of the microwaves emitted from the microwave source may be adjusted based on at least one of a distance between the microwave source and the abutting section, the orientation of the microwaves emitted from the microwave source relative to the abutting section or the temperature of the abutting section.

Preferably, the pressure within the process chamber and/or the temperature in the region of the abutting section is reduced upon detection of a change of the shape of the thermoplastic composite parts in comparison to their initial shape upon placement in the process chamber. The pressure within the process chamber and/or the temperature in the region of the abutting section in particular may be reduced upon detection of an abnormal change of the shape of the abutting section and/or of non-abutting sections of the thermoplastic composite parts.

Multiple microwave sources may be arranged along an inner wall of the process chamber, preferably in one or multiple rows, wherein the multiple microwave sources in particular may be controlled individually so as to selectively emit microwaves depending on a position and/or an orientation of the abutting section.

BRIEF DESCRIPTION OF THE DRAWINGS

The invention will be further described under reference to the enclosed drawings, wherein similar elements have similar reference signs. In order to improve readability of the drawings, only some of the similar reference signs are provided while the other can obviously be derived by the skilled reader. In these drawings

DETAILED DESCRIPTION OF THE PREFERRED EMBODIMENTS

Figure 1:
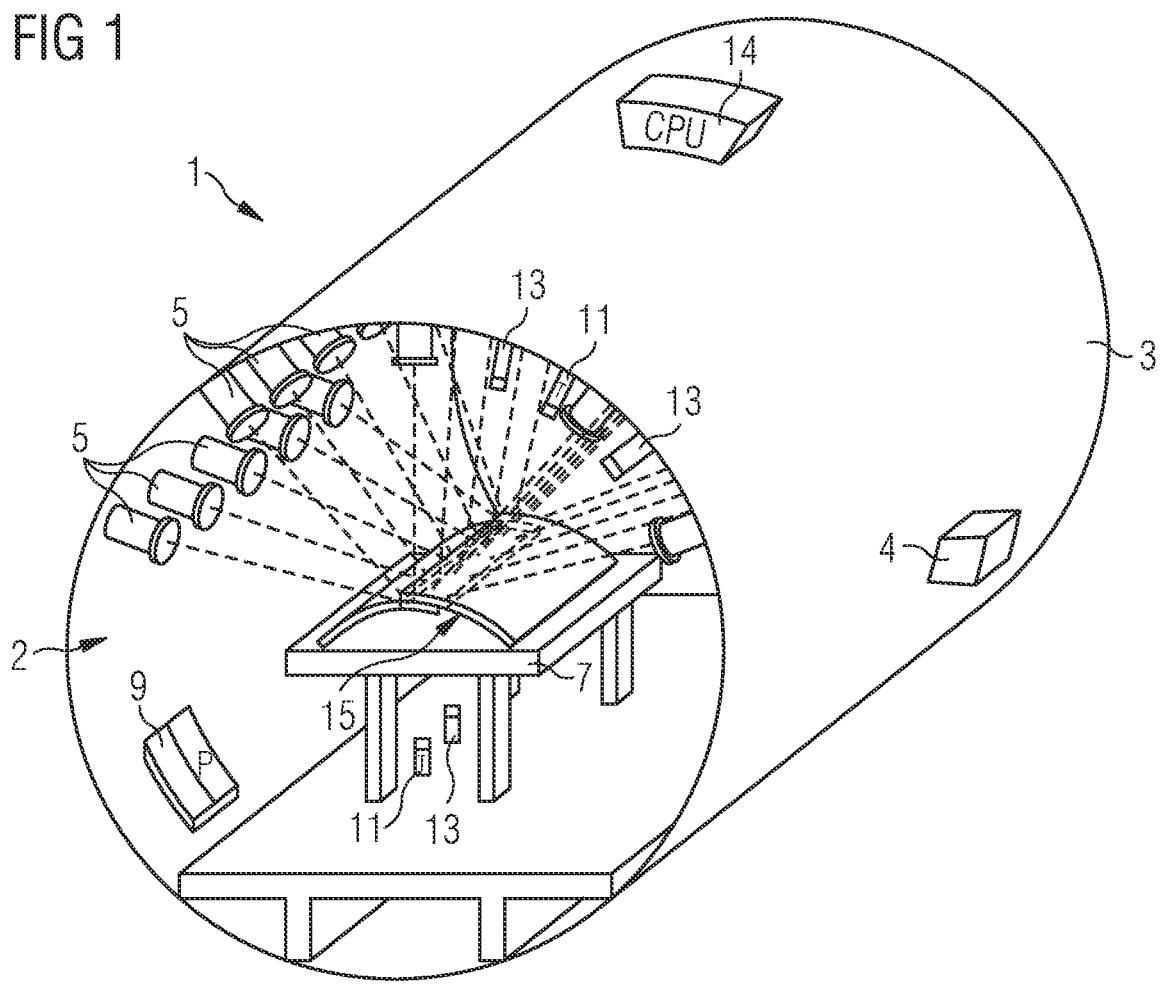
FIG. 1 is a perspective view of an autoclave with multiple microwave sources along its inner wall and a table-like workpiece supporting member with two thermoplastic composite parts overlapping in an abutting section.

FIG. 1 shows a portion of an autoclave 1 with a sealed process chamber 2 enclosed by a cylindrical inner wall 3. A pressure source 4 of the autoclave 1 is configured to generate positive pressure within the process chamber 2 which is higher than an ambient pressure surrounding the process chamber 2 of the autoclave 1. The autoclave further comprises a microwave source 5. In the specific embodiment of an autoclave 1 shown in the drawings, several rows of multiple microwave sources 5 are mounted to the wall 3. Each row of microwave sources 5 extends in parallel to a longitudinal extension of the process chamber 2 and the sum of rows forms a semi-cylinder, which can also be referred to as a top half in a cross-section of the process chamber 2.

The bottom half in said cross-section of the process chamber 2 houses a workpiece supporting member 7, which is arranged in the center of the process chamber 2 and is formed as a table. Inside the autoclave 1 on the workpiece supporting member 7 there are placed thermoplastic composite parts 15 to be welded.

Figure 2:
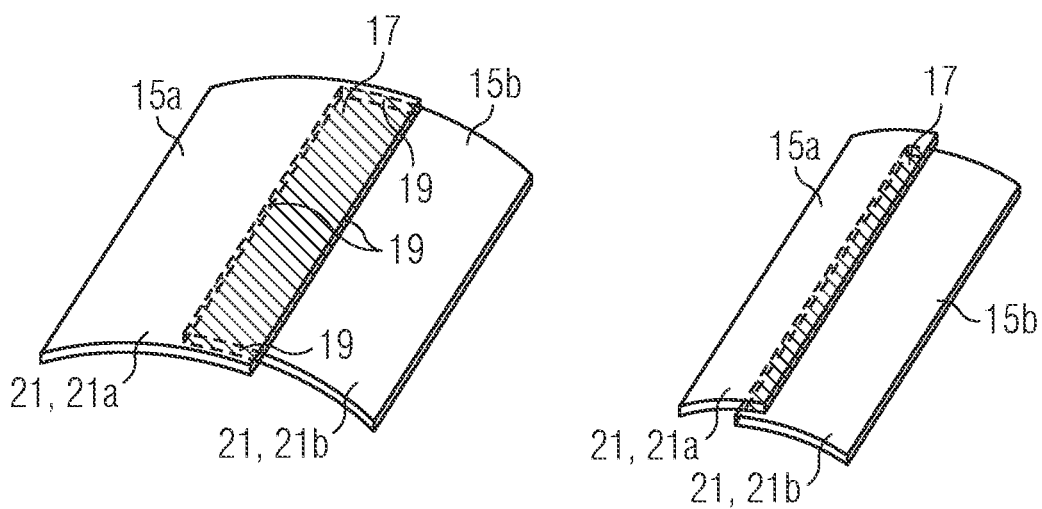
FIG. 2 is a perspective view of two different sets of thermoplastic composite parts overlapping in an abutting section without the table-like workpiece supporting member in FIG. 1.

FIG. 2 shows two configurations of such thermoplastic composite parts 15a, 15b directly contacting each other over a common contacting-/abutting section 17. This abutting section 17 is outlined by edges 19 of at least one of the parts 15a, 15b. The remaining sections of the parts 15a, 15b are denoted as non-abutting sections 21.

The autoclave 1 comprises, in addition to the pressure source 4, a pressure sensor 9. Also, the autoclave 1 has temperature sensors 11 and cameras 13, which are mounted on the wall 3. The cameras 13 form a first and a second monitoring device for monitoring a position and/or an orientation of the thermoplastic composite parts 15 in the process chamber 2 and a shape of the thermoplastic composite parts 15 in the process chamber 2.

A control unit 14 is connected to the pressure source 4, the microwave sources 5, the pressure sensor 9, the temperature sensors 11 and the cameras 13.

With reference to FIGS. 1 and 2, the operation of the autoclave 1 for welding the thermoplastic composite parts 15 in the region their abutting section 17 shall be described.

The thermoplastic composite parts 15 are placed inside the process chamber 4 of the autoclave 1 on the workpiece supporting member 7 such that they contact each other in their abutting section 17. The cameras 13 monitor the position and orientation of the parts 15 inside the autoclave 1 and analyze the position and orientation of the abutting section 17. Based on this analysis, the microwave sources 5 are directed to the abutting section 17. Additionally, they can be moved along the wall 3 to reach a desired position on the wall 3. While one microwave source 5 can be used, several microwave sources 5 allow focusing on different portions of the abutting section 17, which is advantageous for uniformly heating large abutting sections 17. The cameras 13 may additionally or alternatively be used to film and record the initial shape of the parts 15 in order to allow a monitoring and a comparison of their shape during and after the welding.

Subsequently, depending on a distance and orientation of the microwave sources 5 to the abutting section 17, the intensity of each of the microwave sources 5 is set. Additionally, it can be determined that only some of the microwave sources 5 will be used for the welding, which may depend on the position, orientation and/or size of the abutting section 17. Then, the process chamber 2 is sealed and the pressure in the process chamber 2 is increased by means of the pressure source 4 to a set level and the microwave sources 5 are turned on and emit microwaves of a distinct frequency between 915 MHz and 2.45 GHz for a set or adjustable amount of time to heat the abutting section 17 and, thereby, weld the parts 15 to each other. Of course, the sealing of the process chamber can be performed directly after the thermoplastic composite parts 15 are placed inside the process chamber 4.

During the heating/welding of the parts 15, the pressure sensor 9 monitors the pressure inside the pressure chamber 4 of the autoclave 1. When, by means of the cameras 13, it is determined that the shape of the parts 15 changes abnormally, the positive pressure inside the autoclave 1 can be reduced.

At the same time, the temperature sensor 11, being a non-contact infrared temperature sensor, whose orientation and position are adjustable relative to the workpiece supporting member 7, monitors the temperature at the abutting section 17. For this purpose, the temperature sensor 11 may be directed towards a visible edge 19 of the abutting section 17. On the basis of the monitored temperature the position, orientation and/or intensity of the microwave sources 5 can be controlled. Also, when by means of the cameras 13 it is determined that the shape of the parts 15 changes abnormally, the position, orientation and/or intensity of the microwave sources 5 can be controlled accordingly to cause a decrease in temperature.

For the operations described above, the control unit 14 can be provided readily.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An autoclave for welding thermoplastic composite parts, comprising:
   a sealed process chamber,
   a pressure source,
   a microwave source,
   a workpiece supporting member configured to support at least two thermoplastic composite parts which contact each other in an abutting section within the process chamber,
   a first monitoring device adapted to monitor the shape of the thermoplastic composite parts in the process chamber, and
   wherein the pressure source is configured to generate positive pressure in the process chamber which is higher than an ambient pressure surrounding the process chamber, while the microwave source emits microwaves towards the abutting section, in order to locally melt the thermoplastic composite parts and weld them together in the region of the abutting section, and
   wherein the pressure source is configured to reduce the pressure within the process chamber upon detection of a change of the shape of the thermoplastic composite parts in comparison to their initial shape upon placement in the process chamber.

2. The autoclave according to claim 1, further comprising at least one of:
   a second monitoring device adapted to monitor at least one of a position and an orientation of the thermoplastic composite parts in the process chamber;
   a temperature sensor adapted to monitor a temperature of the abutting section; or
   a pressure sensor adapted to monitor the pressure within the process chamber.

3. The autoclave according to claim 2, wherein at least one of the first or the second monitoring device comprises at least one camera configured to film the workpiece supporting member and also the thermoplastic composite parts, wherein two or more cameras are provided and configured to film the workpiece supporting member, and also the thermoplastic composite parts, from different perspectives.

4. The autoclave according to claim 2, further comprising:
   a control unit configured to control an operation of at least one of the workpiece supporting member, the pressure source or the microwave source, in dependence on at least one of the position or the orientation of the thermoplastic composite parts in the process chamber, the temperature of the abutting section, the shape of the thermoplastic composite parts in the process chamber, or the pressure within the process chamber.

5. The autoclave according to claim 2, wherein at least one of the microwave source or the workpiece supporting member is movable in dependence on at least one of the position or the orientation of the thermoplastic composite parts in the process chamber in order to direct the microwaves emitted from the microwave source onto the abutting section.

6. The autoclave according to claim 2, wherein the microwave source is configured such that at least one of an orientation or an intensity of the microwaves emitted from the microwave source is adjustable based on at least one of a distance between the microwave source and the abutting section, the orientation of the microwaves emitted from the microwave source relative to the abutting section or the temperature of the abutting section.

7. The autoclave according to claim 2, wherein the pressure source is configured to reduce the pressure within the process chamber upon detection of an abnormal change of the shape of at least one of the abutting section or non-abutting sections of the thermoplastic composite parts.

8. The autoclave according to claim 1, wherein multiple microwave sources are arranged along an inner wall of the process chamber, in one or multiple rows, wherein the multiple microwave sources are configured to be controlled individually.

9. A method for welding thermoplastic composites in an autoclave, comprising the steps:
    placing two thermoplastic composite parts, which contact each other in an abutting section, on a workpiece supporting member inside a sealed process chamber of the autoclave;
    pressurizing the sealed process chamber with positive pressure which is higher than an ambient pressure surrounding the process chamber by means of a pressure source;
    simultaneously emitting microwaves from a microwave source towards the abutting section in order to locally melt the thermoplastic composite parts and weld them together in the region of the abutting section; and
    monitoring the shape of the thermoplastic composite parts in the process chamber,
    wherein the pressure within the process chamber is reduced upon detection of a change of the shape of the thermoplastic composite parts in comparison to their initial shape upon placement in the process chamber.

10. The method according to claim 9, further comprising at least one of the additional steps of:
    monitoring at least one of a position and an orientation of the thermoplastic composite parts in the process chamber;
    monitoring a temperature of the abutting section; and
    monitoring a pressure within the process chamber.

11. The method according to claim 10, wherein an operation of at least one of the workpiece supporting member, the pressure source or the microwave source is controlled in dependence on at least one of the position or the orientation of the thermoplastic composite parts in the process chamber, the temperature of the abutting section, the shape of the thermoplastic composite parts in the process chamber, or the pressure within the process chamber.

12. The method according to claim 10, wherein at least one of the microwave source or the workpiece supporting member is moved in dependence on at least one of the position or the orientation of the thermoplastic composite parts in the process chamber in order to direct the microwaves emitted from the microwave source onto the abutting section.

13. The method according to claim 10, wherein at least one of an orientation or an intensity of the microwaves emitted from the microwave source is adjusted based on at least one of a distance between the microwave source and the abutting section, the orientation of the microwaves emitted from the microwave source relative to the abutting section or the temperature of the abutting section.

14. The method according to claim 10, wherein the pressure within the process chamber is reduced upon detection of an abnormal change of the shape of at least one of the abutting section or non-abutting sections of the thermoplastic composite parts.

15. The method according to claim 9, wherein multiple microwave sources are arranged along an inner wall of the process chamber, in one or multiple rows, wherein the multiple microwave sources are controlled individually so as to selectively emit microwaves depending on at least one of a position or an orientation of the abutting section.

* * * * *